No. 658,456. Patented Sept. 25, 1900.
W. McCAUSLAND.
MEASURING FAUCET.
(Application filed Nov. 28, 1899.)
(No Model.)
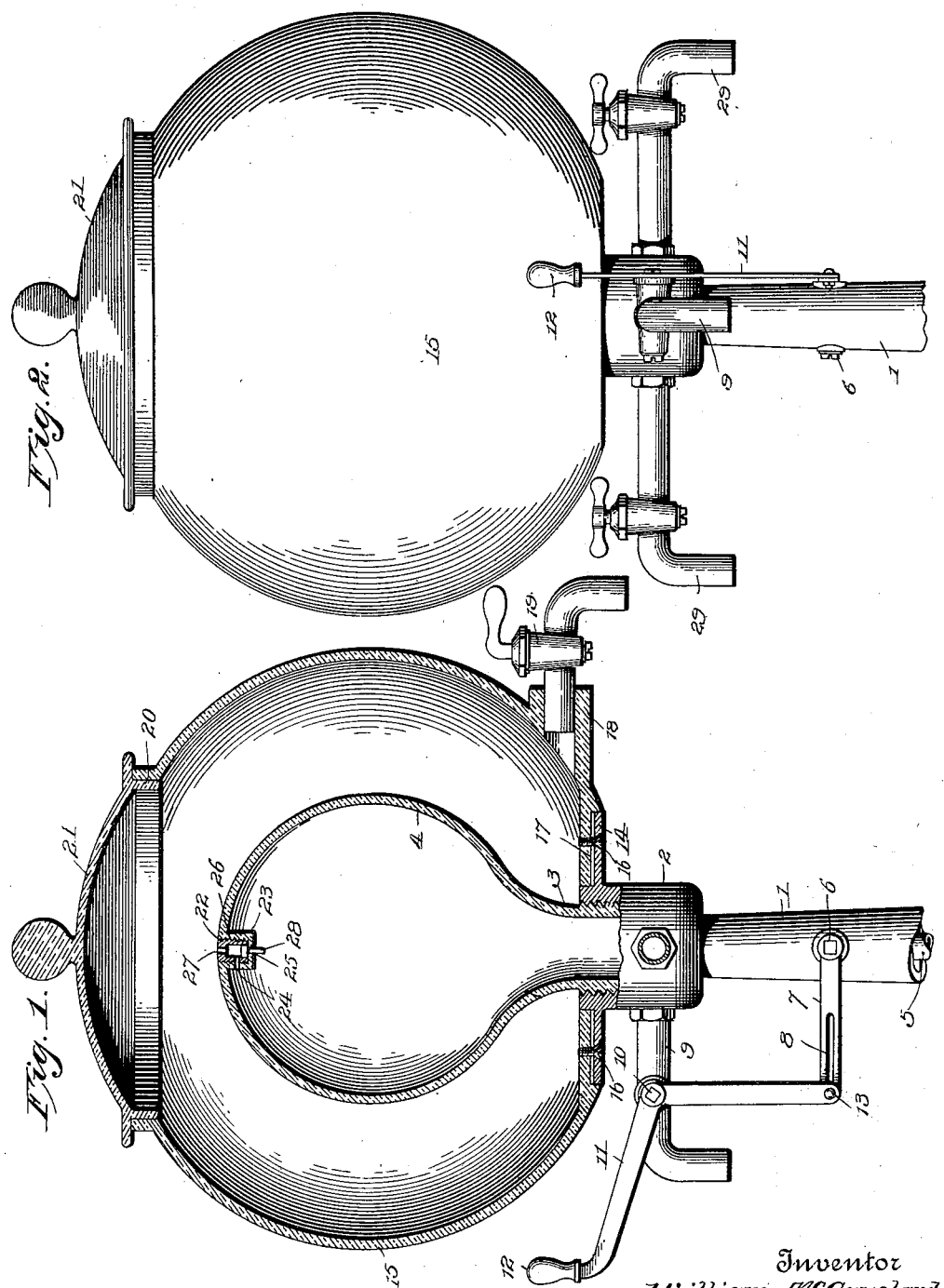
Witnesses
Louis D. Heinrichs
J. C. McCeary.
Inventor
William McCausland
By Victor J. Evans
Attorney

UNITED STATES PATENT OFFICE.

WILLIAM McCAUSLAND, OF NEW YORK, N. Y.

MEASURING-FAUCET.

SPECIFICATION forming part of Letters Patent No. 658,456, dated September 25, 1900.

Application filed November 28, 1899. Serial No. 738,551. (No model.)

*To all whom it may concern:*

Be it known that I, WILLIAM MCCAUSLAND, a citizen of the United States, residing at New York, in the county of New York and State of New York, have invented certain new and useful Improvements in Measuring-Faucets, of which the following is a specification.

My invention relates to self-measuring faucets; and its object is to provide a device of this character of simple and inexpensive construction provided with means for cooling the liquid dispensed before it is discharged through the faucet.

The construction of the improvement will be fully described hereinafter in connection with the accompanying drawings, which constitute a part of this specification, and its novel features will be defined in the appended claims.
In the drawings, Figure 1 is a vertical section, partly in side elevation, of a self-measuring faucet embodying the invention; and Fig. 2 is a front elevation thereof.

The reference-numeral 1 designates a hollow standard circumferentially enlarged at its upper end to form a socket 2, which is internally threaded to receive the externally-threaded stem 3 of a glass measuring vessel 4, of globular form. Within the hollow standard 1 is arranged the liquid-supply pipe 5, the lower end of which is adapted to be attached to a barrel or other liquid-containing reservoir. (Not shown.) The flow of liquid through the pipe 5 is controlled by a valve 6, supported in bearings in the standard and provided at one end with a lever 7, formed with an elongated slot 8.

9 designates a discharge-spout secured to the socket 2 of the standard and provided with a transversely-arranged plug-valve 10, to one end of which is secured the angle of a bell-crank lever 11. One end of this lever 11 is provided with a handle 12, and the opposite end of said lever is connected by a cross-pin 13 with the slotted end of the lever 7, said cross-pin being adapted to move in the slot 8 of said lever and the relative arrangement of the valves 6 and 10 being such that when one of said valves is open the other is closed, and vice versa.

At the upper end of the standard and formed integral with the socket 2 is an annular horizontal flange 14, upon which is secured a casing 15 of globular form. The bottom of this casing is formed with a central opening, through which the upper end of the socket 2 projects, and is also formed with an annular recess, within which the flange 14 fits. The casing 15 is secured by screws 16, passing through the flange 14 and into the bottom of the casing, as shown in Fig. 1, and a filling 17, of cement or other material, is interposed between the flange 14 and the bottom of the casing. The casing 15 is provided with a spout extension 18, within which is fitted a stopcock 19. The top of the casing is formed with a flanged opening 20, closed by a cover 21.

The top of the measuring vessel 4 is provided with an opening 22, around which depends within the vessel an externally-threaded casing 23, provided with a side opening 24 and a valve-opening 25. An externally-threaded bushing 26 fits within the casing 23 and is provided with a vent 27. A float-valve 28 is supported within the bushing 25.
The socket 2 at the upper end of the standard may be provided with one or more supplemental faucets 29, if desired.

The operation of the device is as follows: When the valve 6 is opened by the movement of the lever 11, the valve 10 is closed and the liquid rises through the pipe 5 into the vessel 4. The liquid entering the vessel forces the air therein out through the vent-openings 24 and 27, and when the vessel is full the liquid raises the float-valve 28 to close the air-vent 27. The liquid may then be drawn off through the faucet 9 or supplemental faucets 29.

The space between the measuring vessel and the casing 15 is adapted to be filled with ice to cool the liquid. The casing 15 also serves as a water-cooler, from which the water may be drawn through the faucet 19.

It will be observed that the casing 15 and the vessel 4 are firmly secured in position upon the standard.

While I have shown the measuring vessel and its casing as of globular form, I would have it understood that the invention is not restricted to any special form of vessel and globe, the general shape or contour of these parts being immaterial.

I claim—

1. In a measuring-faucet, the combination with a hollow standard circumferentially enlarged at its upper end and internally threaded to form a socket; a measuring vessel externally threaded at its lower end to engage the socket, and provided with an air-vent at its top; a liquid-supply pipe within the hollow standard; a faucet secured to said socket; valves for said supply-pipe and faucet; and connections between said valves comprising a bell-crank secured to the faucet-valve, and a slotted lever secured to the pipe-valve, whereby the closing of one of said valves opens the other, and vice versa.

2. In a measuring-faucet, the combination with a hollow standard formed at its upper end with a socket; of a globular measuring vessel having a stem fitting said socket; a valved liquid-supply pipe within the hollow standard; a valved faucet connected with the valve of the supply-pipe; an annular horizontal flange projecting from said socket; and a globular casing secured to said flange formed with an opening to receive the upper end of the socket, and with a discharge-faucet.

3. In a measuring-faucet, the combination with a hollow standard and a liquid-supply pipe arranged therein; of a measuring vessel secured to the upper end of the standard; a discharge-faucet communicating therewith; a valve within the liquid-supply pipe; a slotted lever extending therefrom; a valve within the discharge-pipe; and a bell-crank lever secured thereto and engaging with, and movable within, the slotted lever.

4. In a measuring-faucet, the combination with a hollow standard and a liquid-supply pipe arranged therein; of a measuring vessel secured to the upper end of the standard and having an air-outlet at the top thereof; a floating valve within said outlet; a valve in the supply-pipe and having a slotted lever secured thereto; a valve within the discharge-faucet; and a bell-crank lever secured to said valve and engaging and movable within the slotted lever.

5. In a measuring-faucet, the combination with a hollow standard and a liquid-supply pipe; of a measuring vessel secured to the upper end of the standard and having an air-outlet in the top thereof; a valve within the outlet; a valve within the supply-pipe having a slotted lever thereto; a valve within the discharge-faucet; a bell-crank lever secured thereto and engaging with, and movable within, the slotted lever; a casing secured to the standard and inclosing the measuring vessel; and a discharge vessel within said casing.

6. In a measuring-faucet, the combination with an internally-threaded hollow standard; of an annular flange at the upper end thereof; a measuring vessel projecting into and engaging with said standard, said vessel having a valved air-outlet; a casing inclosing the measuring vessel and secured to the flange of the standard; an inlet and an outlet to said measuring vessel; and valves therein, so arranged as to open and close alternately from a common lever.

In testimony whereof I affix my signature in presence of two witnesses.

WILLIAM McCAUSLAND.

Witnesses:
 GEORGE F. SCHOEPP,
 EUGENE A. DUGAN.